United States Patent
Fu et al.

(10) Patent No.: US 11,878,940 B2
(45) Date of Patent: Jan. 23, 2024

(54) BIOACTIVE GLASS COMPOSITIONS

(71) Applicant: Corning Incorporated, Corning, NY (US)

(72) Inventors: Qiang Fu, Painted Post, NY (US); Qing Zhou, Shanghai (CN)

(73) Assignee: CORNING INCORPORATED, Corning, NY (US)

( * ) Notice: Subject to any disclaimer, the term of this patent is extended or adjusted under 35 U.S.C. 154(b) by 696 days.

(21) Appl. No.: 16/992,534

(22) Filed: Aug. 13, 2020

(65) Prior Publication Data
US 2021/0047233 A1 Feb. 18, 2021

(30) Foreign Application Priority Data
Aug. 13, 2019 (CN) .......................... 201910744506.6

(51) Int. Cl.
| | |
|---|---|
| *C03C 3/097* | (2006.01) |
| *C03C 13/00* | (2006.01) |
| *C03C 4/00* | (2006.01) |
| *C03C 17/32* | (2006.01) |
| *C03C 3/087* | (2006.01) |

(52) U.S. Cl.
CPC ............ *C03C 3/097* (2013.01); *C03C 4/0007* (2013.01); *C03C 13/00* (2013.01); *C03C 17/324* (2013.01); *C03C 3/087* (2013.01); *C03C 2201/50* (2013.01); *C03C 2201/54* (2013.01)

(58) Field of Classification Search
CPC ......... C03C 3/087; C03C 3/097; C03C 13/00; C03C 4/007; C03C 17/28; C03C 17/324; C03C 17/32; C03C 17/322; C03C 17/328
See application file for complete search history.

(56) References Cited

U.S. PATENT DOCUMENTS

| | | | | |
|---|---|---|---|---|
| 6,054,400 A | * | 4/2000 | Brink ....................... | A61K 6/54 106/35 |
| 7,074,730 B2 | | 7/2006 | Apel et al. | |
| 2004/0167006 A1 | * | 8/2004 | Apel ....................... | C03C 10/16 65/33.3 |
| 2005/0118236 A1 | | 6/2005 | Qiu et al. | |
| 2009/0208428 A1 | | 8/2009 | Hill et al. | |
| 2009/0324668 A1 | * | 12/2009 | Kangasniemi ......... | A61K 33/00 424/724 |
| 2014/0023865 A1 | * | 1/2014 | Comte .................... | C03C 3/083 501/63 |
| 2019/0161391 A1 | | 5/2019 | Deng et al. | |

FOREIGN PATENT DOCUMENTS

| | | |
|---|---|---|
| CN | 105819697 A | 8/2016 |
| WO | 96/21628 A1 | 7/1996 |
| WO | 03/50051 A1 | 6/2003 |
| WO | 2009/013497 A1 | 1/2009 |
| WO | 2012/137158 A1 | 10/2012 |

OTHER PUBLICATIONS

European Patent Application No. 20190002.4, Extended European Search Report dated Jan. 18, 2021; 5 pages; European Patent Office.
Hench, L.L., Bioceramics. Journal of the American Ceramic Society, 1998. 81(7): p. 1705-1728.
Jones; "Review of Bioactive Glass: From Hench to Hybrids"; Acta Biomaterialia 9 (2013) pp. 4457-4486.
Miguez-Pacheco et al., "Bioactive glasses beyond bone and teeth: emerging applications in contact with soft tissues", Acta Biomaterialia, vol. 13, 2015, pp. 1-15.
Rahaman et al; "Bioactive Glass in Tissue Engineering", Acta Biomaterialia, 7, (2011), 2355-2373.
Wheeler et al., "Effect of bioactive glass particle size on osseous regeneration of cancellous defects", Journal of biomedical materials research, vol. 41(4), 1998, pp. 527-533.
Wheeler et al., "Evaluation of particulate Bioglass® in a rabbit radius ostectomy model", Journal of biomedical materials research, vol. 35(2), 1997, pp. 249-254.

* cited by examiner

*Primary Examiner* — Elizabeth A. Bolden
(74) *Attorney, Agent, or Firm* — Travis B. Gasa

(57) ABSTRACT

A silicate-based glass composition includes: 50-70 wt. % $SiO_2$, 0.01-10 wt. % $P_2O_5$, 10-30 wt. % $Na_2O$, 0.01-10 wt. % CaO, 0.01-10 wt. % MO, and 15-30 wt. % $R_2O$, such that MO is the sum of MgO, CaO, SrO, BeO, and BaO, and $R_2O$ is the sum of $Na_2O$, $K_2O$, $Li_2O$, $Rb_2O$, and $Cs_2O$.

16 Claims, 1 Drawing Sheet

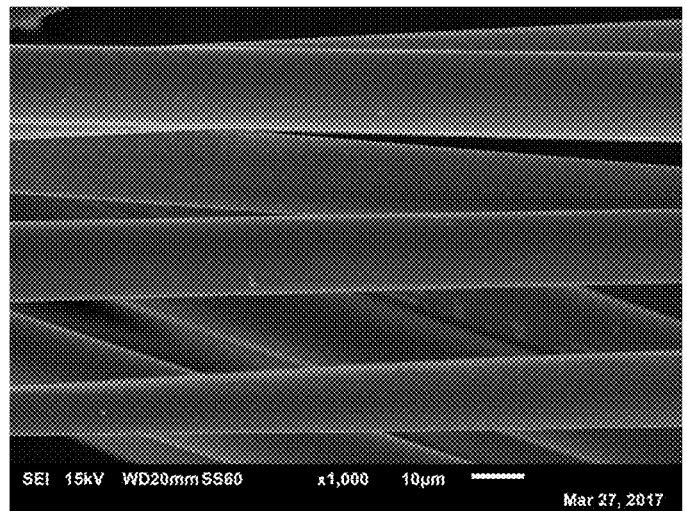

BIOACTIVE GLASS COMPOSITIONS

BACKGROUND

This application claims the benefit of priority under 35 U.S.C. § 119 of Chinese Patent Application Serial No. 201910744506.6, filed on Aug. 13, 2019, the content of which is relied upon and incorporated herein by reference in its entirety.

1. Field

The disclosure relates to biocompatible inorganic compositions for biomedical applications.

2. Technical Background

Bioactive glasses are a group of glass and glass ceramic materials that have shown biocompatibility or bioactivity, which has allowed them to be incorporated into human or animal physiology. Generally speaking, bioactive glasses are able to bond with hard and soft tissues, thereby fostering growth of bone and cartilage cells. Moreover, bioactive glasses may also enable release of ions which activate expression of osteogenic genes and stimulate angiogenesis, as well as promote vascularization, wound healing, and cardiac, lung, nerve, gastrointestinal, urinary tract, and laryngeal tissue repair.

To meet the requirements for each different application, glasses may be formed as particulates, microspheres, fibers, and scaffolds. However, currently available glasses often suffer from a lack of viscous flow sintering due to devitrification (i.e., crystallization), which limits its ability to sinter into complex shapes (e.g., 45S5 glass), or reduced bioactivity, which prevents effective functionality (e.g., 13-93 glass). Lower liquidus viscosity is a challenge for producing continuous fiber or fabrics from existing bioactive glass compositions. For example, 45S5 glass has a liquidus viscosity of 24 poise (P) at 1185° C. and 13-93 glass has a liquidus viscosity of 200 P at 1145° C. In comparison, traditional soda lime silicate glass has a liquidus viscosity of about 10,000 P at 1010° C.

Thus, there continues to be an unmet need for bioactive glass compositions and fabrication processes thereof to produce fabrics woven from biopolymer-coated, continuous glass fibers.

SUMMARY

In some embodiments, a silicate-based glass composition, comprises: 50-70 wt. % $SiO_2$, 0.01-10 wt. % $P_2O_5$, 10-30 wt. % $Na_2O$, 0.01-10 wt. % CaO, 0.01-10 wt. % MO, and 15-30 wt. % $R_2O$, wherein MO is the sum of MgO, CaO, SrO, BeO, and BaO, and wherein $R_2O$ is the sum of $Na_2O$, $K_2O$, $Li_2O$, $Rb_2O$, and $Cs_2O$.

In one aspect, which is combinable with any of the other aspects or embodiments, the glass composition further comprises: 0.01-10 wt. % $K_2O$, and 0.01-5 wt. % MgO.

In one aspect, which is combinable with any of the other aspects or embodiments, the glass composition further comprises: 0-10 wt. % $Al_2O_3$, 0-10 wt. % ZnO, 0-10 wt. % $B_2O_3$, and 0-5 wt. % $Li_2O$.

In one aspect, which is combinable with any of the other aspects or embodiments, the glass composition is configured to have a viscosity of at least 100-poise (P) at temperatures in a range of 1000° C. to 1500° C., and a liquidus temperature in a range of 900° C. to 1200° C.

In one aspect, which is combinable with any of the other aspects or embodiments, a fiber filament comprises a glass composition described herein, having a diameter in a range of 5 μm to 25 μm.

In one aspect, which is combinable with any of the other aspects or embodiments, the fiber filament further comprises: a biopolymer coating including at least one of: polylactic acid (PLA), polyglycolic acid (PGA), co-polymers thereof (PLGA), poly D,L-lactic acid (PDLLA), poly 3-hydroxybutyrate (P(3HB)), alginate, polycaprolactone (PCL), or polyvinyl-alcohol (PVA).

In one aspect, which is combinable with any of the other aspects or embodiments, a yarn comprises at least one fiber filament described herein, wherein the yarn has at least 50 holes.

In one aspect, which is combinable with any of the other aspects or embodiments, the glass composition, further comprises: hydroxyapatite formation within seven days of immersion in simulated body fluid (SBF).

In one aspect, which is combinable with any of the other aspects or embodiments, the hydroxyapatite formation comprises: granular spherical crystals having at least one size dimension in a range of 0.1-10 μm.

In one aspect, which is combinable with any of the other aspects or embodiments, a difference between a glass transition temperature ($T_g$) of the glass composition and an onset of crystallization temperature ($T_{c,\,o}$) of at least 200° C.

In one aspect, which is combinable with any of the other aspects or embodiments, wherein the glass composition is a particle, bead, particulate, woolen mesh, or combination thereof.

In one aspect, which is combinable with any of the other aspects or embodiments, wherein the glass composition has at least one size dimension in a range of 1-100 μm.

In one aspect, which is combinable with any of the other aspects or embodiments, wherein the glass composition has at least one size dimension in a range of 1-10 μm.

In one aspect, which is combinable with any of the other aspects or embodiments, the glass composition, comprises: 60-70 wt. % $SiO_2$, 5-10 wt. % $P_2O_5$, 20-30 wt. % $Na_2O$, 1-10 wt. % $K_2O$, 1-4 wt. % MgO, and 0.01-5 wt. % CaO.

In one aspect, which is combinable with any of the other aspects or embodiments, the glass composition further comprises: 1-6 wt. % $K_2O$, and 1-5 wt. % MgO.

In one aspect, which is combinable with any of the other aspects or embodiments, the glass composition is essentially free of $B_2O_3$, $Al_2O_3$, ZnO, and $Li_2O$.

In one aspect, which is combinable with any of the other aspects or embodiments, a matrix comprises a glass composition described herein, wherein the matrix includes at least one of: a toothpaste, mouthwash, rinse, spray, ointment, salve, cream, bandage, polymer film, oral formulation, pill, capsule, or transdermal formulation.

In one aspect, which is combinable with any of the other aspects or embodiments, the glass composition is attached to the matrix or mixed therein.

BRIEF DESCRIPTION OF THE DRAWINGS

The disclosure will become more fully understood from the following detailed description, taken in conjunction with the accompanying figures, in which:

The FIGURE illustrates a scanning electron microscopy (SEM) image of glass fibers produced from Example 5 using a down-draw process, according to some embodiments.

DETAILED DESCRIPTION

In the following description, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range as well as any ranges therebetween. It also is understood that the various features disclosed in the specification and the drawings can be used in any and all combinations.

Where a range of numerical values is recited herein, comprising upper and lower values, unless otherwise stated in specific circumstances, the range is intended to include the endpoints thereof, and all integers and fractions within the range. It is not intended that the scope of the claims be limited to the specific values recited when defining a range. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed. Finally, when the term "about" is used in describing a value or an end-point of a range, the disclosure should be understood to include the specific value or end-point referred to. When a numerical value or end-point of a range does not recite "about," the numerical value or end-point of a range is intended to include two embodiments: one modified by "about," and one not modified by "about."

Herein, glass compositions are expressed in terms of wt % amounts of particular components included therein on an oxide bases unless otherwise indicated. Any component having more than one oxidation state may be present in a glass composition in any oxidation state. However, concentrations of such component are expressed in terms of the oxide in which such component is at its lowest oxidation state unless otherwise indicated.

Unless otherwise specified, all compositions are expressed in terms of weight percent (wt %). Coefficients of thermal expansion (CTE) are expressed in terms of $10^{-7}/°$ C., unless otherwise specified. The CTE can be determined, for example, using the procedure described in ASTM E228 "Standard Test Method for Linear Thermal Expansion of Solid Materials with a Push-Rod Dilatometer" or ISO 7991: 1987 "Glass—Determination of coefficient of mean linear thermal expansion." The density in terms of grams/cm$^3$ was measured via the Archimedes method (ASTM C693). Young's modulus, shear modulus, and Poisson's Ratio were measured via the ASTM C623 standard.

Strain point (° C.) and annealing point (° C.) may be measured using a beam bending viscometer (ASTM C598-93), $T_{liq}$ (° C.) may be measured using a gradient furnace method (ASTM C829-81). Refractive index at 589.3 nm may be measured using a spectrophotometer.

Glass Compositions

Bioactive glasses are a group of glass and glass ceramic materials that have shown biocompatibility or bioactivity, which has allowed them to be incorporated into human or animal physiology. The biocompatibility and in vivo properties of the glass are influenced by the glass composition. In the glass compositions described herein, $SiO_2$ serves as the primary glass-forming oxide in combination with the bioactive oxides of calcium and phosphorous.

In some examples, the glass comprises a combination of $SiO_2$, $Na_2O$, $P_2O_5$, and CaO. In some examples, the glass further comprises $K_2O$, and/or MgO. In some examples, may further comprise $Al_2O_3$, ZnO $B_2O_3$, and/or $Li_2O$. For example, the glass may comprise a composition including, in wt. %: 50-70 $SiO_2$, 10-30 $Na_2O$, 0.01-10 $P_2O_5$, and 0.01-10 CaO. In some examples, the glass may further comprise, in wt. %: 0.01-10 $K_2O$ and 0.01-5 MgO. In some examples, the glass may further comprise, in wt. %: 0-10 $Al_2O_3$, 0-10 ZnO, 0-10 $B_2O_3$, and 0-5 $Li_2O$. In some examples, the glass comprises, in wt. %: 0.01-10 MO and 15-30 $R_2O$, wherein MO is the sum of MgO, CaO, SrO, BeO, and BaO and $R_2O$ is the sum of $Na_2O$, $K_2O$, $Li_2O$, $Rb_2O$, and $Cs_2O$. In other examples, the glass composition comprises 60-70 wt. % $SiO_2$. In some examples, the glass composition comprises 5-10 wt. % $P_2O_5$. The silicate glasses disclosed herein are particularly suitable for biomedical or bioactive applications.

Silicon dioxide ($SiO_2$), which serves as the primary glass-forming oxide component of the embodied glasses, may be included to provide high temperature stability and chemical durability. For the glasses disclosed herein, compositions including excess $SiO_2$ (e.g., greater than 70 wt. %) suffer from decreased bioactivity. Moreover, glasses containing too much $SiO_2$ often also have too high melting temperatures (e.g., greater than 200 poise temperature).

In some embodiments, the glass can comprise 50-70 wt. % $SiO_2$. In some examples, the glass may comprise 60-70 wt. % $SiO_2$. In some examples, the glass can comprise 50-70 wt. %, or 60-70 wt. %, or 60-68 wt. %, or 62-68 wt. %, or 62-66 wt. %, or 60-65 wt. %, or 65-70 wt. % $SiO_2$, or any value or range disclosed therein. In some examples, the glass is essentially free of $SiO_2$ or comprises 50, 51, 52, 53, 54, 55, 56, 57, 58, 59, 60, 61, 62, 63, 64, 65, 66, 67, 68, 69, 70 wt. % $SiO_2$, or any value or range having endpoints disclosed herein.

Phosphorus pentoxide ($P_2O_5$) also serves as a network former. Furthermore, the liberation of phosphate ions to the surface of bioactive glasses contributes to the formation of apatite. The inclusion of phosphate ions in the bioactive glass increases apatite formation rate and the binding capacity of the bone tissue. In addition, $P_2O_5$ increases the viscosity of the glass, which in turn expands the range of operating temperatures, and is therefore an advantage to the manufacture and formation of the glass. In some examples, the glass can comprise 0.01-10 wt. % $P_2O_5$. In some examples, the glass can comprise 5-10 wt. % $P_2O_5$. In some examples, the glass can comprise 0.01-10 wt. %, or 1-10 wt. %, or 5-10 wt. %, or 5-9.5 wt. %, or 5.5-9.5 wt. %, or 5.5-9.0 wt. %, or 6.0-9.0 wt. % $P_2O_5$, or any value or range disclosed therein. In some examples, the glass can comprise about 0.01, 0.1, 0.25, 0.5, 0.75, 1, 2, 3, 4, 5, 6, 7, 8, 9, 10 wt. % $P_2O_5$, or any value or range having endpoints disclosed herein.

Alkali oxides ($Na_2O$, $K_2O$, $Li_2O$, $Rb_2O$, or $Cs_2O$) serve as aids in achieving low melting temperature and low liquidus temperatures. Meanwhile, the addition of alkali oxides can improve bioactivity. Further, $Na_2O$ and $K_2O$ may influence the coefficient of thermal expansion, especially at low temperatures. In some examples, the glass can comprise a total of 15-30 wt. % $Na_2O$ and $K_2O$ combined. In some examples, the glass can comprise a total of 15-30 wt. % $Na_2O$, $K_2O$, $Li_2O$, $Rb_2O$, and $Cs_2O$ combined.

In some examples, the glass can comprise from 10-30 wt. % $Na_2O$. In some examples, the glass can comprise 15-25 wt. % $Na_2O$. In some examples, the glass can comprise 10-30 wt. %, or 20-30 wt. %, or 20-29 wt. %, or 21-29 wt.

%, or 21-28 wt. %, or 22-28 wt. %, or 22-27 wt. %, or 23-27 wt. %, or 23-26, or 18-25 wt. %, or 20-23 wt. % $Na_2O$, or any value or range disclosed therein. In some examples, the glass can comprise about 10, 11, 12, 13, 14, 15, 16, 17, 18, 19, 20, 21, 22, 23, 24, 25, 26, 27, 28, 29, 30 wt. % $Na_2O$, or any value or range having endpoints disclosed herein.

In some examples, the glass can comprise from 0.01-10 wt. % $K_2O$. In some examples, the glass can comprise 1-10 wt. % $K_2O$. In some examples, the glass can comprise 0.01-10 wt. %, or 0.1-10 wt. %, or 1-8 wt. %, or 1-7 wt. %, or 1-6 wt. %, or 1.5-6 wt. %, or 1.5-5.5 wt. %, or 2-5.5 wt. %, or 2-5 wt. % $K_2O$, or any value or range disclosed therein. In some examples, the glass can comprise about 0.01, 0.1, 0.25, 0.5, 0.75, 1, 2, 3, 4, 5, 6, 7, 8, 9, 10 wt. % $K_2O$, or any value or range having endpoints disclosed herein.

In some examples, the glass can comprise from 0-5 wt. % $Li_2O$. In some examples, the glass can comprise from >0-5 wt. % $Li_2O$. In some examples, the glass can comprise from about >0-2.5 wt. % $Li_2O$. In some examples, the glass can comprise 0-5 wt. %, or >0-5 wt. %, or >0-4.5 wt. %, or >0-4 wt. %, or >0-3.5 wt. %, or >0-3 wt. %, or >0-2.5 wt. %, or 3-5 wt. %, or 3.5-5 wt. %, or 4-5 wt. %, or 4.5-5 wt. % $Li_2O$, or any value or range disclosed therein. In some examples, the glass can comprise about 0, >0, 0.5, 1, 1.5, 2, 2.5, 3, 3.5, 4, 4.5, 5 wt. % $Li_2O$, or any value or range having endpoints disclosed herein.

In some examples, the total amount of the alkalis $Na_2O$, $K_2O$, $Li_2O$, $Rb_2O$, and/or $Cs_2O$ ($R_2O$) is important to the glass properties. In some examples, the glass can comprise 15-30 wt. % $R_2O$, wherein $R_2O$ is the sum of $Na_2O$, $K_2O$, $Li_2O$, $Rb_2O$, and $Cs_2O$. In some examples, the glass can comprise 20-30 wt. % $R_2O$. In some examples, the glass can comprise from 15-30 wt. %, or 20-30 wt. %, or 21-30 wt. %, or 21-29 wt. %, or 22-29 wt. %, or 22-28 wt. % $R_2O$, or any value or range disclosed therein. In some examples, the glass can comprise about 15, 16, 17, 18, 19, 20, 21, 22, 23, 24, 25, 26, 27, 28, 29, 30 wt. % $R_2O$, or any value or range having endpoints disclosed herein.

Divalent cation oxides (such as alkaline earth oxides) also improve the melting behavior and the bioactivity of the glass. Particularly, CaO is found to be able to react with $P_2O_5$ to form apatite when immersed in a simulated body fluid (SBF) or in vivo. The release of $Ca^{2+}$ ions from the surface of the glass contributes to the formation of a layer rich in calcium phosphate. Thus, the combination of $P_2O_5$ and CaO may provide advantageous compositions for bioactive glasses. In some examples, the glass compositions comprise $P_2O_5$ and CaO with the sum of $P_2O_5$ and CaO being from 0.01-20 wt. %, or 1-20 wt. %, or 1-18 wt. %, or 3-18 wt. %, or 3-16 wt. %, or 5-16 wt. %, or 5-14 wt. %, or 7-14 wt. %, or any value or range disclosed therein. In some examples, the glass compositions comprise $P_2O_5$ and CaO with the sum of $P_2O_5$ and CaO being 0.01, 0.1, 0.25, 0.5, 0.75, 1, 2, 3, 4, 5, 6, 7, 8, 9, 10, 11, 12, 13, 14, 15, 16, 17, 18, 19, 20 wt. %, or any value or range disclosed herein.

In some examples, the glass can comprise 0.01-10 wt. % CaO. In some examples, the glass can comprise 0.01-5 wt. % CaO. In some examples, the glass can comprise 0.01-10 wt. %, or 0.01-5 wt. %, or 0.1-5 wt. %, or 0.1-4.5 wt. %, or 0.5-4.5 wt. %, or 0.5-4.0 wt. %, or 1-4.0 wt. % CaO, or any value or range disclosed therein. In some examples, the glass can comprise about 0.01, 0.1, 0.25, 0.5, 0.75, 1, 2, 3, 4, 5, 6, 7, 8, 9, 10 wt. % CaO, or any value or range having endpoints disclosed herein.

In some examples, the glasses comprise MgO. In some examples, the glass can comprise 0.01-5 wt. % MgO. In some examples, the glass can comprise 1-5 wt. % MgO. In some examples, the glass can comprise from >0-5 wt. %, or 0.01-5 wt. %, or 0.5-5 wt. %, or 0.5-4.5 wt. %, or 0.75-4.5 wt. %, or 0.75-4 wt. %, or 1-4 wt. %, or 1-3.5 wt. %, or 1.5-3.5 wt. % MgO, or any value or range disclosed therein. In some examples, the glass can comprise >0, 0.01, 0.5, 0.75, 1, 1.5, 2, 2.5, 3, 3.5, 4, 4.5, 5 wt. % MgO, or any value or range having endpoints disclosed herein.

Strontium oxide (SrO) may be present in some embodiments and in such examples, the glass can comprise from 0-10 wt. % SrO. In some examples, the glass can comprise from >0-10 wt. % SrO. In some examples, the glass can comprise from 3-10 wt. %, 5-10 wt. %, 5-8 wt. % SrO, or any value or range disclosed therein. In some examples, the glass can comprise from 0-10 wt. %, 0-8 wt. %, 0-6 wt. %, 0-4 wt. %, 0-2 wt. %, >0-10 wt. %, >0-8 wt. %, >0-6 wt. %, >0-4 wt. %, >0-2 wt. %, 1-10 wt. %, 1-8 wt. %, 1-6 wt. %, 1-4 wt. %, 1-2 wt. %, 3-8 wt. %, 3-6 wt. %, 3-10 wt. %, 5-8 wt. %, 5-10 wt. %, 7-10 wt. %, or 8-10 wt. % SrO, or any value or range disclosed therein. In some examples, the glass can comprise about >0, 1, 2, 3, 4, 5, 6, 7, 8, 9, or 10 wt. % SrO, or any value or range having endpoints disclosed herein.

Barium oxide (BaO) may be present in some examples and in such examples, the glass can comprise from 0-15 wt. % BaO. In some examples, the glass can comprise from 0-10 wt. %, >0-5 wt. %, 6-13 wt. %, 5-15 wt. %, 7-13 wt. %, 7-11 wt. %, 8-12 wt. % BaO, or any value or range disclosed therein. In some examples, the glass can comprise from 0-15 wt. %, 0-13 wt. %, 0-11 wt. %, 0-9 wt. %, 0-7 wt. %, 0-5 wt. %, >0-15 wt. %, >0-13 wt. %, >0-11 wt. %, >0-9 wt. %, >0-7 wt. %, >0-5 wt. %, 1-15 wt. %, 1-13 wt. %, 1-11 wt. %, 1-9 wt. %, 1-7 wt. %, 1-5 wt. %, 3-15 wt. %, 3-13 wt. %, 3-11 wt. %, 3-9 wt. %, 3-7 wt. %, 3-5 wt. %, 5-15 wt. %, 5-13 wt. %, 5-11 wt. %, 5-9 wt. %, 5-7 wt. %, 7-15 wt. %, 7-13 wt. %, 7-11 wt. %, 7-9 wt. %, 9-15 wt. %, 9-13 wt. %, 9-11 wt. %, 11-15 wt. %, or 11-13 wt. % BaO, or any value or range disclosed therein. In some examples, the glass can comprise about 0, >0, 1, 2, 3, 4, 5, 6, 7, 8, 9, 10, 11, 12, 13, 14, or 15 wt. % BaO, or any value or range disclosed therein.

Alkaline earth oxides may improve other desirable properties in the materials, including influencing the Young's modulus and the coefficient of thermal expansion. In some examples, the glass comprises from 0.01-10 wt. % MO, wherein MO is the sum of MgO, CaO, SrO, BeO, and BaO. In some examples, the glass comprises 0.01-10 wt. %, or 0.5-10 wt. %, or 0.5-9 wt. %, or 1-9 wt. %, or 1-8 wt. %, or 1.5-8 wt. %, or 1.5-7.5 wt. % MO, or any value or range disclosed therein. In some examples, the glass can comprise about 0.01, 0.1, 0.25, 0.5, 0.75, 1, 2, 3, 4, 5, 6, 7, 8, 9, 10 wt. % MO, or any value or range having endpoints disclosed herein.

In some examples, the glass can comprise 0-10 wt. % $B_2O_3$. In some examples, the glass can comprise >0-10 wt. % $B_2O_3$. In some examples, the glass can comprise 0-5 wt. % $B_2O_3$. In some examples, the glass can comprise from 0-10 wt. %, or >0-10 wt. %, or 2-10 wt. %, or 5-10 wt. %, or 0-8 wt. %, or >0-8 wt. %, or 2-8 wt. %, or 5-8 wt. %, or 0-5 wt. %, or >0-5 wt. %, or 2-5 wt. % $B_2O_3$, or any value or range disclosed therein. In some examples, the glass can comprise 0, >0, 1, 2, 3, 4, 5, 6, 7, 8, 9, or 10 wt. % $B_2O_3$, or any value or range having endpoints disclosed herein.

In some examples, the glasses comprise ZnO. In some examples, the glass can comprise 0-10 wt. % ZnO. In some examples, the glass can comprise from 0-5 wt. % ZnO. In some examples, the glass can comprise from >0-10 wt. %, 3-10 wt. %, or 3-8 wt. % ZnO, or any value or range disclosed therein. In some examples, the glass can comprise from 0-10 wt. %, 0-8 wt. %, 0-6 wt. %, 0-4 wt. %, 0-2 wt. %, >0-10 wt. %, >0-8 wt. %, >0-6 wt. %, >0-4 wt. %, >0-2 wt. %, 1-10 wt. %, 1-8 wt. %, 1-6 wt. %, 1-4 wt. %, 1-2 wt. %, 3-8 wt. %, 3-6 wt. %, 3-10 wt. %, 5-8 wt. %, 5-10 wt. %, 7-10 wt. %, or 8-10 wt. % ZnO, or any value or range disclosed therein. In some examples, the glass can comprise about 0, >0, 1, 2, 3, 4, 5, 6, 7, 8, 9, or 10 wt. % ZnO, or any value or range having endpoints disclosed herein.

Alumina ($Al_2O_3$) may influence the structure of the glass and, additionally, lower the liquidus temperature and coefficient of thermal expansion, or, enhance the strain point. In addition to its role as a network former, $Al_2O_3$ (and $ZrO_2$) help improve the chemical durability in silicate glass while having no toxicity concerns. In some examples, the glass can comprise 0-10 wt. % $Al_2O_3$. In some examples, the glass can comprise from 0-10 wt. %, 0-8 wt. %, 0-6 wt. %, 0-4 wt. %, 0-2 wt. %, >0-10 wt. %, >0-8 wt. %, >0-6 wt. %, >0-4 wt. %, >0-2 wt. %, 1-10 wt. %, 1-8 wt. %, 1-6 wt. %, 1-4 wt. %, 1-2 wt. %, 3-8 wt. %, 3-6 wt. %, 3-10 wt. %, 5-8 wt. %, 5-10 wt. %, 7-10 wt. %, or 8-10 wt. % $Al_2O_3$, or any value or range disclosed therein. In some examples, the glass can comprise 0, >0, 1, 2, 3, 4, 5, 6, 7, 8, 9, or 10 wt. % $Al_2O_3$, or any value or range having endpoints disclosed herein.

Additional components can be incorporated into the glass to provide additional benefits or may be incorporated as contaminants typically found in commercially-prepared glass. For example, additional components can be added as coloring or fining agents (e.g., to facilitate removal of gaseous inclusions from melted batch materials used to produce the glass) and/or for other purposes. In some examples, the glass may comprise one or more compounds useful as ultraviolet radiation absorbers. In some examples, the glass can comprise 3 wt. % or less ZnO, $TiO_2$, CeO, MnO, $Nb_2O_5$, $MoO_3$, $Ta_2O_5$, $WO_3$, $SnO_2$, $Fe_2O_3$, $As_2O_3$, $Sb_2O_3$, Cl, Br, or combinations thereof. In some examples, the glass can comprise from 0 to about 3 wt. %, 0 to about 2 wt. %, 0 to about 1 wt. %, 0 to 0.5 wt. %, 0 to 0.1 wt. %, 0 to 0.05 wt. %, or 0 to 0.01 wt. % ZnO, $TiO_2$, CeO, MnO, $Nb_2O_5$, $MoO_3$, $Ta_2O_5$, $WO_3$, $SnO_2$, $Fe_2O_3$, $As_2O_3$, $Sb_2O_3$, Cl, Br, or combinations thereof. The glasses, according to some examples, can also include various contaminants associated with batch materials and/or introduced into the glass by the melting, fining, and/or forming equipment used to produce the glass. For example, in some embodiments, the glass can comprise from 0 to about 3 wt. %, 0 to about 2 wt. %, 0 to about 1 wt. %, 0 to about 0.5 wt. %, 0 to about 0.1 wt. %, 0 to about 0.05 wt. %, or 0 to about 0.01 wt. % $SnO_2$ or $Fe_2O_3$, or combinations thereof.

EXAMPLES

The embodiments described herein will be further clarified by the following examples.

Non-limiting examples of amounts of precursor oxides for forming the embodied glasses are listed in Table 1, along with the properties of the resulting glasses. Internal liquidus temperature ($T_{liq}$) was measured using a gradient boat method according to ASTM standards. Internal liquidus viscosity ($\eta_{liq}$) was measured using a gradient boat method according to ASTM standards.

TABLE 1

| Oxides (wt %) | 45S5 | 13-93 | 1 | 2 | 3 | 4 | 5 | 6 | 7 | 8 |
|---|---|---|---|---|---|---|---|---|---|---|
| $SiO_2$ | 45.0 | 53.0 | 65.6 | 64.4 | 64.4 | 63.2 | 62.1 | 64.4 | 63.2 | 61.0 |
| $Na_2O$ | 24.5 | 6.0 | 22.5 | 22.1 | 22.1 | 21.7 | 21.3 | 22.1 | 21.7 | 20.9 |
| $K_2O$ | 0.0 | 12.0 | 0.0 | 0.0 | 1.8 | 3.6 | 5.3 | 0.0 | 0.0 | 3.4 |
| CaO | 24.5 | 20.0 | 4.6 | 4.5 | 4.5 | 4.4 | 4.3 | 4.5 | 4.4 | 4.3 |
| MgO | 0.0 | 5.0 | 0.0 | 0.0 | 0.0 | 0.0 | 0.0 | 1.8 | 3.6 | 3.4 |
| $P_2O_5$ | 6.0 | 4.0 | 7.4 | 9.1 | 7.3 | 7.1 | 7.0 | 7.3 | 7.1 | 6.9 |
| $T_{liq}$ (° C.) | 1185 | 1145 | 1105 | 1195 | 1005 | 1015 | 990 | 1070 | 1090 | 1040 |
| $\eta_{liq}$ (poise) | 24 | 200 | 765 | 335 | 657 | 1679 | 2000 | 1131 | 883 | 1230 |

The glass compositions disclosed herein can be in any form that is useful for the medical and dental processes disclosed. The compositions can be in the form of, for example, particles, powder, microspheres, fibers, sheets, beads, scaffolds, woven fibers.

As exemplified in Table 1, Examples 1-8 represent bioactive glass compositions with high liquidus viscosity (as compared with 45S5 and 13-93 glasses), making them suitable for continuous fiber drawing using an industrial platform.

In some examples, the glass comprises a combination of $SiO_2$, $Na_2O$, $P_2O_5$, and CaO. In some examples, the glass further comprises $K_2O$, and/or MgO. In some examples, may further comprise $Al_2O_3$, ZnO, $B_2O_3$, and/or $Li_2O$. For example, the glass may comprise a composition including, in wt. %: 50-70 $SiO_2$, 10-30 $Na_2O$, 0.01-10 $P_2O_5$, and 0.01-10 CaO. In some examples, the glass may further comprise, in wt. %: 0.01-10 $K_2O$ and 0.01-5 MgO. In some examples, the glass comprises, in wt. %: 0.01-10 MO and 15-30 $R_2O$, wherein MO is the sum of MgO, CaO, SrO, BeO, and BaO and $R_2O$ is the sum of $Na_2O$, $K_2O$, $Li_2O$, $Rb_2O$, and $Cs_2O$. The silicate glasses disclosed herein are particularly suitable for biomedical or bioactive applications. In one embodiment, compositional ranges include, as represented by weight percentage: 60-70 $SiO_2$, 15-30 $Na_2O$, 5-15 $K_2O$, 1-10 CaO, and 5-10% $P_2O_5$.

Composition described herein have a 100-poise (P) viscosity at temperatures ranging between 1000° C. to 1500° C., and liquidus temperatures in a range of 900° C. to 1200° C., thereby making them compatible with the melting and forming platform for fiber drawing.

Continuous fibers may be drawn from the compositions described herein. For example, single fiber filament of 10-20 μm may be drawn using a down-draw process. In this process, glass cullet was loaded into a bushing and heated to a temperature in a range of 1050° C. to 1200° C. to obtain a glass melt. The viscosity of this glass melt was in a range of about 200 poise to 1500 poise, which allowed for a glass drip on the orifice in the bushing. The drip was then pulled by hand to begin forming a fiber. Once a fiber was established, the fiber was connected to a rotating pulling/collection drum to continue the pulling process at a constant speed. Using the drum speed (or revolutions per minute RPM) and glass viscosity of the fiber diameter may be manipulated. In general, a faster pull speed results in a smaller fiber diameter. FIG. 1 illustrates a scanning electron microscopy (SEM) image of glass fibers produced from Example 5 of Table 1 using a down-draw process, according to some embodiments. Continuous fibres of uniform diameters can be drawn from example compositions. Yarns comprising filament having diameters (1) of 5-25 μm may be produced using Pt/Rh bushing that contains at least 50 holes (e.g., 50-800 holes). A reinforcing biopolymer coating (e.g., polylactic acid (PLA), polyglycolic acid (PGA), co-polymers thereof (PLGA), poly D,L-lactic acid (PDLLA), poly 3-hydroxybutyrate (P(3HB)), alginate, polycaprolactone (PCL), or polyvinyl-alcohol (PVA)) may be applied to single filaments for improving yarn flexibility. Biopolymer coatings are applied to the filament through a contact coating method by passing filament through a polymer-containing reservoir positioned between the bushing and fiber drawing machine. Coating amounts may vary between about 0.4 wt. % and 1.5 wt. % of the fiber. Moreover, glass mats may be produced by secondary treatments of the yarns through high-temperature, high-pressure air environments to produce finer fibers ($\Phi<3$ μm). The yarns are exposed to mixed gas/oxygen burner of a temperature in a range of 1200° C. to 1500° C., with an air flow in a range of 0.01 m$^3$/s to 0.05 m$^3$/s to blow into finer fibers. Thereafter, basic weaves (e.g., plain, twill, and satin) can be produced from the yarns. The combination of weaves and yarns produce glass textile in 2-D sheets or 3-D structures for different applications.

Biocompatibility and degradation characteristics may be influenced by glass composition. In the glass compositions described herein, $SiO_2$ serves as the primary glass-forming oxide. Excessively high $SiO_2$ content results in the melting temperature (200 poise temperature) being too high (e.g., pure $SiO_2$ or high-$SiO_2$ glasses) and decrease of glass bioactivity.

Glass Bioactivity

Aspects are related to compositions or matrices containing embodied bioactive glass compositions and the methods of using the matrices to treat medical conditions. The matrices can be a toothpaste, mouthwash, rinse, spray, ointment, salve, cream, bandage, polymer film, oral formulation, pill, capsule, transdermal formulation, and the like. The bioactive glass compositions claimed can be physically or chemically attached to matrices or other matrix components, or simply mixed in. As noted above, the bioactive glass can be in any form that works in the application, including particles, beads, particulates, short fibers, long fibers, or woolen meshes. The methods of using the glass-containing matrices to treat a medical condition can be simply like the use of matrix as normally applied.

Glass Making Processes

Glasses having the oxide contents listed in Table 1 can be made via traditional methods. For example, in some examples, the precursor glasses can be formed by thoroughly mixing the requisite batch materials (for example, using a turbular mixer) in order to secure a homogeneous melt, and subsequently placing into silica and/or platinum crucibles. The crucibles can be placed into a furnace and the glass batch melted and maintained at temperatures ranging from 1100° C. to 1400° C. for times ranging from about 6 hours to 24 hours. The melts can thereafter be poured into steel molds to yield glass slabs. Subsequently, those slabs can be transferred immediately to an annealer operating at about 400° C. to 700° C., where the glass is held at temperature for about 0.5 hour to 3 hours and subsequently cooled overnight. In another non-limiting example, precursor glasses are prepared by dry blending the appropriate oxides and mineral sources for a time sufficient to thoroughly mix the ingredients. The glasses are melted in platinum crucibles at temperatures ranging from about 1100° C. to 1400° C. and held at temperature for about 6 hours to 16 hours. The resulting glass melts are then poured onto a steel table to cool. The precursor glasses are then annealed at appropriate temperatures.

The embodied glass compositions can be ground into fine particles in the range of 1-10 microns (μm) by air jet milling or short fibers. The particle size can be varied in the range of 1-100 μm using attrition milling or ball milling of glass frits. Furthermore, these glasses can be processed into short fibers, beads, sheets or three-dimensional scaffolds using different methods. Short fibers are made by melt spinning or electric spinning; beads can be produced by flowing glass particles through a hot vertical furnace or a flame torch; sheets can be manufactured using thin rolling, float or fusion-draw processes; and scaffolds can be produced using rapid prototyping, polymer foam replication and particle sintering. Glasses of desired forms can be used to support cell growth, soft and hard tissue regeneration, stimulation of gene expression or angiogenesis.

Continuous fibers can be easily drawn from the claimed composition using processes known in the art. For example, fibers can be formed using a directly heated (electricity passing directly through) platinum bushing. Glass cullet is loaded into the bushing, heated up until the glass can melt. Temperatures are set to achieve a desired glass viscosity (usually <1000 poise) allowing a drip to form on the orifice in the bushing (Bushing size is selected to create a restriction that influences possible fiber diameter ranges). The drip is pulled by hand to begin forming a fiber. Once a fiber is established it is connected to a rotating pulling/collection drum to continue the pulling process at a consistent speed. Using the drum speed (or revolutions per minute RPM) and glass viscosity the fiber diameter can be manipulated—in general the faster the pull speed, the smaller the fiber diameter. Glass fibers with diameters in the range of 1-100 μm can be drawn continuously from a glass melt. Fibers can also be created using an updraw process. In this process, fibers are pulled from a glass melt surface sitting in a box furnace. By controlling the viscosity of the glass, a quartz rod is used to pull glass from the melt surface to form a fiber. The fiber can be continuously pulled upward to increase the fiber length. The velocity that the rod is pulled up determines the fiber thickness along with the viscosity of the glass.

Thus, as presented herein, biocompatible inorganic compositions and fabrication processes thereof are described for producing 2-D and 3-D glass textiles woven from biopolymer-coated, continuous glass fibers.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone;

A and B in combination; A and C in combination; B and C in combination; or A, B, and C in combination.

References herein to the positions of elements (e.g., "top," "bottom," "above," "below," "first," "second," etc.) are merely used to describe the orientation of various elements in the FIGURES. It should be noted that the orientation of various elements may differ according to other exemplary embodiments, and that such variations are intended to be encompassed by the present disclosure. Moreover, these relational terms are used solely to distinguish one entity or action from another entity or action, without necessarily requiring or implying any actual such relationship or order between such entities or actions.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims. In other words, the terms "about," "approximately," and the like, mean that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art.

Thus, a glass that is "free" or "essentially free" of a component is one in which that component is not actively added or batched into the glass, but may be present in very small amounts as a contaminant (e.g., 500, 400, 300, 200, or 100 parts per million (ppm) or less or).

As utilized herein, "optional," "optionally," or the like are intended to mean that the subsequently described event or circumstance can or cannot occur, and that the description includes instances where the event or circumstance occurs and instances where it does not occur. As used herein, the indefinite articles "a," "an," and the corresponding definite article "the" mean "at least one" or "one or more," unless otherwise specified.

With respect to the use of substantially any plural and/or singular terms herein, those having skill in the art can translate from the plural to the singular and/or from the singular to the plural as is appropriate to the context and/or application. The various singular/plural permutations may be expressly set forth herein for the sake of clarity.

Unless otherwise specified, all compositions are expressed in terms of as-batched weight percent (wt. %). As will be understood by those having ordinary skill in the art, various melt constituents (e.g., silicon, alkali- or alkaline-based, boron, etc.) may be subject to different levels of volatilization (e.g., as a function of vapor pressure, melt time and/or melt temperature) during melting of the constituents. As such, the as-batched weight percent values used in relation to such constituents are intended to encompass values within ±0.5 wt. % of these constituents in final, as-melted articles. With the forgoing in mind, substantial compositional equivalence between final articles and as-batched compositions is expected.

It will be apparent to those skilled in the art that various modifications and variations can be made without departing from the spirit or scope of the claimed subject matter. Accordingly, the claimed subject matter is not to be restricted except in light of the attached claims and their equivalents.

What is claimed is:

1. A fiber filament comprising a silicate-based glass composition, the glass composition comprising:
   50-70 wt. % $SiO_2$,
   0.01-10 wt. % $P_2O_5$,
   10-30 wt. % $Na_2O$,
   0.01-10 wt. % CaO,
   0.01-10 wt. % MO, and
   15-30 wt. % $R_2O$,
   wherein MO is the sum of MgO, CaO, SrO, BeO, and BaO;
   wherein $R_2O$ is the sum of $Na_2O$, $K_2O$, $Li_2O$, $Rb_2O$, and $Cs_2O$, and
   wherein the fiber filament comprises a biopolymer coating including at least one of: polylactic acid (PLA), polyglyolic acid (PGA), co-polymers thereof (PLGA), poly D,L-lactic acid (PDLLA), poly 3-hydroxybutyrate (P(3HB)), alginate, polycaprolactone (PCL), or polyvinyl-alcohol (PVA).

2. The fiber filament of claim 1, wherein the glass composition further comprises:
   0.01-10 wt. % $K_2O$, and
   0.01-5 wt. % MgO.

3. The fiber filament of claim 1, wherein the glass composition further comprises:
   0-10 wt. % $Al_2O_3$,
   0-10 wt. % ZnO,
   0-10 wt. % $B_2O_3$, and
   0-5 wt. % $Li_2O$.

4. The fiber filament of claim 1, wherein the glass composition comprises:
   60-70 wt. % $SiO_2$,
   5-10 wt. % $P_2O_5$,
   20-30 wt. % $Na_2O$,
   1-10 wt. % $K_2O$,
   1-4 wt. % MgO, and
   0.01-5 wt. % CaO.

5. The fiber filament of claim 4, wherein the glass composition further comprises:
   1-6 wt. % $K_2O$.

6. The fiber filament of claim 4, wherein the glass composition is essentially free of $B_2O_3$, $Al_2O_3$, ZnO, and $Li_2O$.

7. The fiber filament of claim 1, wherein the glass composition is configured to have a viscosity of at least 100-poise (P) at temperatures in a range of 1000° C. to 1500° C., and a liquidus temperature in a range of 900° C. to 1200° C.

8. The fiber filament of claim 1, wherein the glass composition is configured for hydroxyapatite formation within seven days of immersion in simulated body fluid (SBF).

9. The fiber filament of claim 8, wherein the hydroxyapatite formation comprises: granular spherical crystals having at least one size dimension in a range of 0.1-10 μm.

10. The fiber filament of claim 1, wherein a difference between a glass transition temperature ($T_g$) of the glass composition and an onset of crystallization temperature ($T_{c,o}$) is at least 200° C.

11. The fiber filament of claim 1 produced via a contact coating method by passing the fiber filament through a polymer-containing reservoir.

12. The fiber filament of claim 1, having a diameter in a range of 5 μm to 25 μm.

13. A yarn comprising at least one fiber filament of claim 1, where the yarn has at least 50 holes.

14. A textile comprising the fiber filament of claim 1.

15. A matrix comprising the fiber filament of claim 1, wherein:
    the matrix includes at least one of: a toothpaste, mouthwash, rinse, spray, ointment, salve, cream, bandage, polymer film, oral formulation, pill, capsule, or transdermal formulation.

16. The matrix of claim 15, wherein the fiber filament is attached to the matrix or mixed therein.

\* \* \* \* \*

UNITED STATES PATENT AND TRADEMARK OFFICE
CERTIFICATE OF CORRECTION

PATENT NO. : 11,878,940 B2
APPLICATION NO. : 16/992534
DATED : January 23, 2024
INVENTOR(S) : Qiang Fu et al.

Page 1 of 1

It is certified that error appears in the above-identified patent and that said Letters Patent is hereby corrected as shown below:

In the Claims

In Column 12, Line 35, in Claim 1, delete "polyglyolic" and insert -- polyglycolic --.

Signed and Sealed this
First Day of October, 2024

Katherine Kelly Vidal
*Director of the United States Patent and Trademark Office*